US008846266B2

(12) United States Patent
Scott et al.

(10) Patent No.: US 8,846,266 B2
(45) Date of Patent: Sep. 30, 2014

(54) CARBOHYDRATE ANODE FOR FUEL CELL AND BATTERY APPLICATIONS

(75) Inventors: Daniel Marin Scott, Laie, HI (US); BorYann Liaw, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 871 days.

(21) Appl. No.: 12/769,598

(22) Filed: Apr. 28, 2010

(65) Prior Publication Data

US 2010/0279203 A1    Nov. 4, 2010

Related U.S. Application Data

(60) Provisional application No. 61/173,502, filed on Apr. 28, 2009.

(51) Int. Cl.
*H01M 8/08* (2006.01)
*H01M 8/22* (2006.01)
*H01M 4/96* (2006.01)

(52) U.S. Cl.
CPC .............. *H01M 8/083* (2013.01); *H01M 4/96* (2013.01); *H01M 2300/0014* (2013.01); *Y02E 60/50* (2013.01)
USPC ........... 429/505; 429/433; 429/498; 429/501; 429/502

(58) Field of Classification Search
USPC ................. 429/444, 433, 498, 501, 502, 505
See application file for complete search history.

(56) References Cited

U.S. PATENT DOCUMENTS

| | | | |
|---|---|---|---|
| 3,494,797 A * | 2/1970 | Duddy | ........................ 429/444 |
| 4,287,028 A | 9/1981 | Blass | |
| 5,645,709 A | 7/1997 | Birch et al. | |
| 2004/0101741 A1 * | 5/2004 | Minteer et al. | .................. 429/43 |
| 2004/0258562 A1 | 12/2004 | Mills et al. | |

FOREIGN PATENT DOCUMENTS

WO    WO 2008143877 A1 * 11/2008

OTHER PUBLICATIONS

Allen et al., "Microbial Fuel-Cells: Electricity Production from Carbohydrates," *Appl. Biochem. Biotechnol.*, 39/40, 27-40, 1993.
Aoun et al.; "Electrocatalytic Oxidation of Sugars on Silver-UPD Single Crystal Gold Electrodes in Alkaline Solutions," *Electrochem. Comm*; 5, 317-320, 2003.
Barton et al., "Enzymatic Biofuel Cells for Implantable and Microscale devices," *Chem. Rev.*, 104, 4867-4886, 2004.

(Continued)

*Primary Examiner* — Jonathan G Leong
*Assistant Examiner* — James Erwin
(74) *Attorney, Agent, or Firm* — Knobbe, Martens, Olson & Bear, LLP

(57) ABSTRACT

Abiotic fuel cell and battery designs employing chemical dyes in alkaline solutions are disclosed. The fuel cells and batteries are capable of harnessing electrical power from various carbohydrates, including, but not limited to, glucose; in an anode design that does not require catalysts or membranes to separate half-cell reaction chambers. In certain embodiments, the abiotic fuel cell or battery designs may further employ electrodes, such as high surface area carbon materials and commercial air breathing electrodes, without the use of catalysts for glucose oxidation (i.e., precious metals or biocatalytic species). In further embodiments, organic dyes, including but not limited to, methyl viologen (MV), methylene blue, methylene green, Meldola's blue, indigo carmine, safranin O, and the like, may serve as the electron mediators. In some embodiments, the fuel cells or batteries are capable of generating power on the order of about tens of $mW/cm^2$ from glucose and/or other types of sugars.

17 Claims, 11 Drawing Sheets

(56) References Cited

OTHER PUBLICATIONS

Bullen et al., "Biofuel Cells and their Development," *Biosens. Bioelectron*; 21, 2015-2045, 2006.
Chaudhuri et al., "Electricity Generation by Direct Oxidation of Glucose in Mediatorless Microbial Fuel Cells," *Nature Biotechnology.*, 21, No. 10, 1229-1232, 2003.
Chen et al., "A Miniature Biofuel Cell," *J. Am. Chem. Soc.*, 123, 8630-8631, 2001.
Cui et al., "Pt—Pb Alloy Nanoparticle/Carbon Nanotube Nanocomposite: A Strong Electrocatalyst for Glucose Oxidation," *Nanotechnology*, 17, 2334-2339, 2006.
Elahi et al., "Electrocatalytic oxidation of glucose at a Ni-curcumin modified glassy carbon electrode", J. Solid State Electrochem, vol. 11, 2007, pp. 273-282.
Hansen et al., "Viologen Catalyst for Direct-Carbohydrate Fuel Cell," *ECS Transactions*, 16, 2057-2063, 2008.
Heller, A., "Miniature Biofuel Cells," *Phys. Chem. Chem. Phys.*, 6, 209-216, 2004.
Itoh et al, "Oxidation of D-glucose by Coenzyme PQQ. 1,2-Enediolates as Substrates for QQ Oxidation," *J. Chem. Soc., Chem. Comm.*, 20, 1580-1581, 1987.
Katz et al., "Biochemical Fuel Cells," In *Handbook of Fuel Cells-Fundamentals, Technology, Applications* (eds. W. Vielstich, A. Gasteiger and A. Lamm), Ch. 21, (John Wiley & Sons, Chichester, PA), vol. 1(4), 355-381, 2003.
Kerzenmacher et al., "Energy Harvesting by Implantable Abiotically Catalyzed Glucose Fuel Cells," *J. Power Sources*, 182, 1-17, 2008.
Kerzenmacher et al., "An Abiotically Catalyzed Glucose Fuel Cell for Powering Medical Implants: Reconstructed Manufacturing Protocol and Analysis of Performance," *J. Power Sources*, 182, 66-75, 2008.
Logan et al., "Microbial Fuel Cells: Methodology and Technology," *Environ. Sci. Technol.*, 40, 5181-5192, 2006.
Mano et al., "Characteristics of a Miniature Compartment-Less Glucose-$O_2$ Biofuel Cell and its Operation in a Living Plant," *J. Am. Chem. Soc.*, 125, 6588-6594, 2003.
Mano et al., "On the Parameters Affecting the Characteristics of the 'Wired' Glucose Oxidase Anode," *J. Electroanal. Chem.*, 574, 347-357, 2005.
Mano, N., "A 280 µW $cm^{-2}$ Biofuel Cell Operating at Low Glucose Concentration," *Chem. Comm.*, 2221-2223, 2008.
Minteer et al., "Enzyme-Based Biofuel Cells," *Current Opinion in Biotechnology*, 18, 228-234, 2007.
Rabaey et al; "Biofuel Cells Select for Microbial Consortia That Self-Mediate Electron Transfer," *Appl. Environ. Microbiology*, 70, 5373-5382, 2004.
Richter et al.; "Electricity Generation by *Geobacter sulfurreducens* Attached to Gold Electrodes," *Langmuir*, 24, 4376-4379, 2008.
Sakai et al.; "A High-Power Glucose/Oxygen Biofuel Cell Operating Under Quiescent Conditions," *Energy & Environ. Sci.*, 2, 133-138, 2009.
Soukharev et al., "A Four-Electron O-Electroreduction Biocatalyst Superior to Platinum and a Biofuel Cell Operating At 0.88 V," *J. Am. Chem. Soc.*, 126, 8368-8369, 2004.
Topcagic et al., "Development of a Membraneless Ethanol/Oxygen Biofuel Cell," *Electrochim. Acta*, 51, 2168-2172, 2006.
Vuorema et al., "Electrochemical and sonoelectrochemical monitoring of indigo reduction by glucose", Dyes and Pigments, vol. 76, 2008, pp. 542-549.
Watanabe et al., "Amperometric Detection of Reducing Carbohyrdrates in Liquid Chromatography", Analytical Chemistry, vol. 55, No. 7, Jun. 1983, pp. 1016-1019.
Wheeler et al., "Viologen Catalysts for a Direct Carbohydrate Fuel Cell", J. Electrochem. Soc., vol. 156, No. 10, 2009, pp. B1201-B1207.

\* cited by examiner

CARBOHYDRATE ANODE FOR FUEL CELL AND BATTERY APPLICATIONS

CROSS-REFERENCE TO RELATED APPLICATIONS

This application claims the benefit of priority under 35 U.S.C. §119(e) of U.S. Provisional Application No. 61/173,502, filed on Apr. 28, 2009 and entitled "CARBOHYDRATE ANODE." The entirety of this application is hereby incorporated by reference.

STATEMENT REGARDING FEDERALLY SPONSORED R&D

This invention was made with Government support under The Intelligence Community Postdoctoral Fellow Research Program, Contract Number HM1582-04-1-2013, awarded by the National Geospatial Intelligence Agency. The Government has certain rights in this invention.

BACKGROUND OF THE INVENTION

1. Field

Embodiments of the present disclosure are generally directed to power generation and, in particular, to batteries and fuel cells which generate electrical power from carbohydrates.

2. Description of the Related Art

Recent surging fossil fuel costs have heightened the awareness to adopt a more diversified energy policy to ensure energy security and reduce the addiction to fossil fuels. Possible solutions being pursued include biofuels, distributed energy resources (DER), and distributed generation that utilizes a variety of readily available fuels and natural resources. Such distributed power generation must also have an efficient storage mechanism to reduce loss and to increase grid stability, efficiency, and readiness.

Biological systems commonly use carbohydrates as a storage medium and energy source. Mimicking such a natural pathway for future energy storage and conversion would seem to be extremely attractive. For example, it seems natural that carbohydrate fuels would be the most environmentally friendly. Furthermore, food crops rich in carbohydrates (e.g. sugars) are likely to remain available and plentiful in the foreseeable future throughout the world. The production of sugars could easily be scaled up world-wide without technical or social barriers. Additionally, producing sugars as a fuel differs from biofuel production in that a simple extraction would suffice without a complicated energy-intensive refinement process.

As attractive as it may be to mimic nature's chemical energy storage and conversion from sugars to thermal mechanical power, it is even more impressive to convert the stored energy directly to electrical power with oxygen in the air in a battery or fuel cell configuration.

In biological metabolism processes, harnessing carbohydrate energy relies upon enzymes. In past decades, there have been a number of attempts to obtain electric power from carbohydrates in battery or fuel cell configurations and two general classifications of battery or fuel cell designs have been reported, distinguished by the type of catalyst used. One classification of battery or fuel cell designs, biotic designs, attempt to mimic nature by using catalysts such as enzymes or directly using microorganisms. Biotic designs have been considered for commercialization for biomedical applications, such as implants. The other classification of battery or fuel cell designs, abiotic designs, utilizes inorganic catalysts, or precious metals, primarily for glucose sensing and medical implant applications.

Prior pursuits in abiotic fuel cell designs using carbohydrate fuels have been hampered by the inability of the precious metal-based catalysts to sustain power production due to poisoning. The precious metal catalysts are also cost-prohibitive. Recent work on abiotic design report abiotically catalyzed glucose fuel cells for implants that can generate about 1-3 $\mu W/cm^2$ at about 37° C. Regarding microbial designs, an example that is often cited, operated out of microbial consortia with self mediated electron transfer, can generate about 0.431 $mW/cm^2$ (at about 664 mV).

In view of this, biotic designs have been favored, to date, using either microbial or enzymatic catalysts. Enzymatic biotic designs demonstrating about 0.28 $mW/cm^2$ (+0.88 V), while operating at about 37° C. at about pH 5 and about 5 mM glucose with glucose oxidase *Penicillium pinophilum* have been reported. Improved glucose-oxygen enzymatic cell operation achieving about 1.45±0.24 $mW/cm^2$ at about 0.3 V has also been reported.

However, low power density, short lifetime, and complex electrode design still impede the progress in most of these biotic systems. Furthermore, delicate engineering practices are required to achieve workable devices. To separate the fuel and the oxygen, most abiotic and biotic devices use membranes to achieve better efficiency and sustainability. To increase power density in abiotic systems often requires careful optimization and processing in placing the nano-size catalysts on carbon support. Such designs always need to juggle the trade-offs between the costs associated with catalysts and cell performance. They also have to control the balance of the plant to maintain suitable operative conditions and to prolong the life of the catalysts.

Similarly, biotic systems also have to cultivate the biological species with delicate control of the immediate environment to which the species are exposed. In a direct electron transfer scheme, the architecture of immobilizing the biocatalysts onto a sustainable support with an effective configuration remains a difficult challenge. In a mediated system, the complexity of involving multiple species in the electron transfer, from the fuel to enzyme cofactor, to the mediator, and to the current collecting electrode, coupled with the sensitivity of the biocatalyst, inherently results in a less efficient and delicate pathway.

SUMMARY OF THE INVENTION

In one aspect, alkaline fuel cells are provided. The fuel cells typically comprise an anode, a cathode, and an alkaline solution. The alkaline solution is in fluid communication with the anode and the cathode. The alkaline solution further comprises one or more carbohydrates and a mediator dye selected from the group consisting of azides and carmines. The dye may be, for example, methyl viologen. In some embodiments, the fuel cell does not comprise a separator interposed between the anode and the cathode. In other embodiments the fuel cell does not comprise a catalyst.

In another aspect, methods of operating a fuel cell are provided. The methods generally comprise providing an anode, providing a cathode, and providing an alkaline solution in fluid communication with the anode and the cathode. The alkaline solution comprises one or more carbohydrates and a mediator dye selected from the group consisting of azides and carmines. The operating temperature of the fuel cell may be maintained at less than about 35° C. The carbohydrate may be, for example, glucose, fructose, arabinose or sorbose.

In a further aspect, methods of generating a current are provided. The methods may comprise reacting a carbohydrate with an oxidized form of a mediator dye and hydroxide ions in an alkaline solution to yield at least a reduced form of the dye and an oxidized form of the carbohydrate. The dye may then be oxidized at the anode to recover the oxidized form of the dye and one or more electrons. Oxygen may be reacted with water and the one or more produced electrons at a cathode to form hydroxide ions. The dye may be selected from the group consisting of azides and carmines. Furthermore, in certain embodiments, carbon dioxide is produced in the methods.

DETAILED DESCRIPTION OF THE PREFERRED EMBODIMENT

Figure 1:
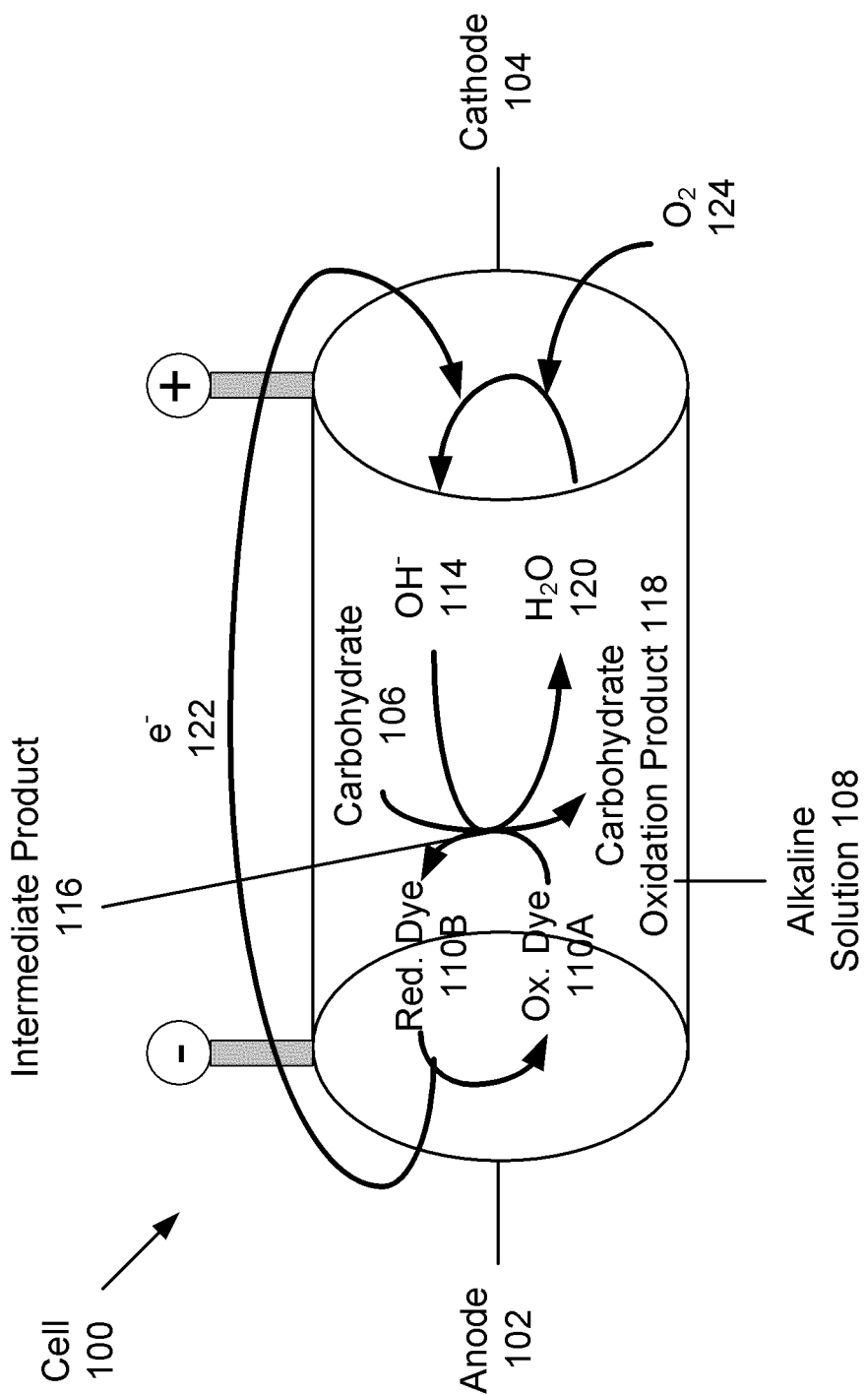
FIG. 1 presents a schematic illustration of an embodiment of a carbohydrate-oxygen alkaline fuel cell or battery.

Aspects of the present disclosure include abiotic battery and/or fuel cell designs and related methods that employ chemical dyes in alkaline solutions and that can be used to generate electrical power from various carbohydrates, including, but not limited to, glucose. In certain embodiments, the abiotic battery or fuel cell designs may further employ electrodes, such as high surface area carbon materials and air breathing electrodes, without the use of catalysts (e.g., precious metals or biocatalysts) for glucose oxidation. Organic dyes, including but not limited to, methyl viologen (MV), methylene blue, methylene green, Meldola's blue, indigo carmine, safranin O, and the like, may serve as electron mediators in the methods and apparatuses.

Beneficially, in embodiments of the battery and fuel cell designs and methods discussed herein, the reaction of the carbohydrate with a hydroxide-containing base can provide a source of electrons that can be transferred to the mediator dye. This process may occur without the assistance of a catalyst at the anode. Furthermore, the reaction is specific, and electron transfer is facile, such that is a separator between the positive electrode and negative electrode to separate the two half-cell reactions (e.g., fuel and oxygen) may be omitted in some embodiments. In addition, in some embodiments the fuel cells or batteries may operate aerobically and in other embodiments they may operate anaerobically.

In some embodiments, the batteries or fuel cells are capable of generating power on the order of about tens of $mW/cm^2$ from glucose and/or other types of sugars. In one example, by employing a carbon containing anode (e.g., carbon felt or glassy carbon) and an air breathing positive electrode, a one $cm^2$ footprint can generate several mW sustainably to power small devices. As further discussed below, in reference to FIG. 3, experimental investigations have found that embodiments of the disclosed systems may generate voltages of up to about 0.3 V and more than about 9 $mA/cm^2$, or greater than about 2.5 $mW/cm^2$, which surpass the power generation of existing biotic or abiotic fuel cell designs. As the battery or fuel cell design does not employ catalysts in some embodiments, these results may be achieved without poisoning or other issues that may inhibit the longevity of the battery or fuel cell.

In further benefit, the cost of producing embodiments of the batteries or fuel cells disclosed herein may be relatively low. For example, the cost of materials such as the dyes, carbohydrate fuel, and electrodes may be relatively low. These costs may be further reduced, in some embodiments, by the absence of precious metal catalysts. The fuel cell costs may also be further reduced in some embodiments by substantially avoiding complicated engineering to achieve power levels on about the $mW/cm^2$ level. For example, as discussed below, some embodiments of the batteries or fuel cells do not utilize a membrane to separate the fuel and air compartments. Additionally, in some embodiments, the electrodes do not require design elements such as nano-size catalysts or multi-layer architectures, which may increase both the cost and complexity of the battery or fuel cell.

Thus, the batteries or fuel cells of the present disclosure can be simple, inexpensive, and efficient. In some embodiments, the batteries or fuel cells are free of precious metals at the anode (negative electrode), open to air, and do not contain a membrane. Furthermore, the battery or fuel cell operation may be generally within the temperature and pressure range that the alkaline solution remains stable in fluid, for example, about room temperature. Additionally, the power output of the battery or fuel cell may be relatively stable over long hours at the above power outputs before replenishment of the fuel source is necessary. These and other advantages of embodiments of the disclosed batteries or fuel cells are discussed in detail below.

FIG. 1 illustrates an alkaline fuel cell or battery 100 for power generation. The cell may comprise an anode (negative electrode) 102 and a cathode (positive electrode) 104 which are positioned between an alkaline solution 108 comprising one or more carbohydrates 106 and a dye 110. The dye 110 may adopt an oxidized form 110A and a reduced form 110B, as discussed below. In certain embodiments, the fuel cell 100 may be employed singly to generate power. In alternative embodiments, two or more of the fuel cells or batteries 100 may be connected in either series or parallel for power generation.

In some embodiments, the anode 102 may comprise one or more materials having a high surface area that are electrochemically and chemically stable in the alkaline solution 108. In certain embodiments, the surface area of the anode 102 may vary with the range of about 0.01 $m^2/g$ to about 1,000 $m^2/g$. In other embodiments, the surface area of the anode may be greater than about 1 $m^2/g$. In some embodiment, the anode 102 may comprise a carbon felt. In other embodiments, the anode 102 may comprise a glassy carbon material.

In some embodiments, the cathode 104 may comprise an air breathing cathode. The air breathing cathode materials may be obtained from commercial sources, which use materials such as platinum (Pt) and other transition metals and their oxides-based catalysts on electrode supports. In other embodiments, the cathode 104 may comprise other redox couples that are capable of providing electrochemical pathways to complete the cell reactions and provide sufficient potential differences for power generation.

In some embodiments, the carbohydrate 106 serves as the fuel source for the cell 100. In certain embodiments, the carbohydrate 106 may comprise one or more monosaccharides, disaccharides, oligosaccharides, and/or polysaccharides. Monosaccharides suitable for the cell 100 may include, but are not limited to, one or more of glucose, arabinose, sorbose, and fructose. In further embodiments, the carbohydrate may comprise one or more carbohydrates which exhibit similar functionalities to the monosaccharides discussed above. The concentration of the carbohydrate 106 within the alkaline solution 108 may range between less than about 0.01 mM to about supersaturation. In other embodiments, the concentration of the carbohydrate 106 within the alkaline solution 108 may range between about 0.01 to about 0.1, from about 0.1 mM to about 1 mM, from about 1 mM to about 10 mM, from about 10 mM to about 100 mM, from about 100 mM to about 500 mM, from about 500 mM to about 1000 mM, from about 1M to about 2M, and greater than about 2 M.

Figure 2:
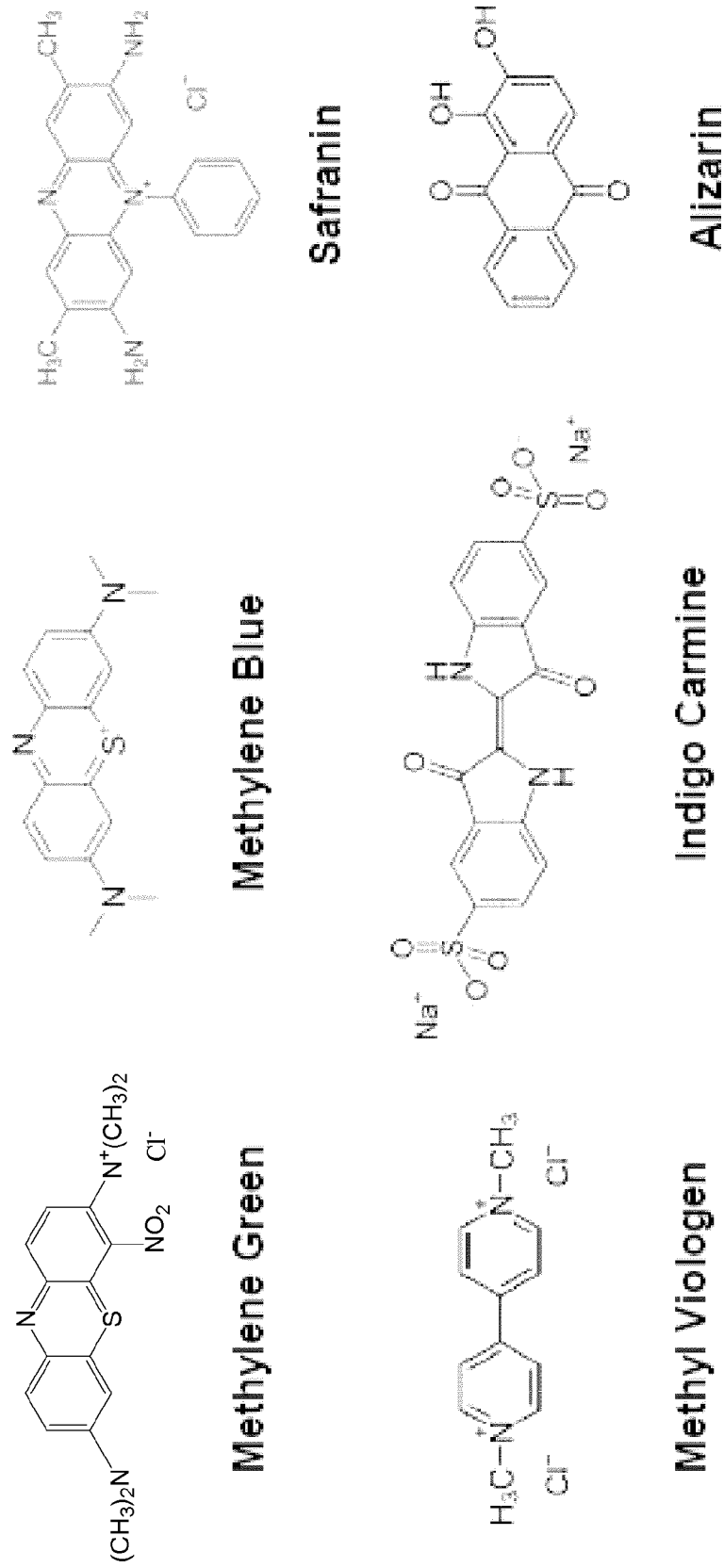
FIG. 2 presents chemical structures of embodiments of electron mediators for use in embodiments of the fuel cells and batteries of FIG. 1.

In some embodiments, the dye 110 serves as an electron mediator. Embodiments of suitable dye mediators may include azines and carmines. Specific examples of dye mediators may include, but are not limited to, Meldola's blue (MB), methyl viologen (MV), methylene blue, methylene green, indigo carmine, safranin O, and other similar dyes that can shuttle the electrons. Examples of the structures of these compounds are illustrated in FIG. 2. The concentration of the dye within the alkaline solution 108 may range between less than about 1 mM to about the solubility limit at the specific temperature of operation. In other embodiments, the concentration of the dye 110 within the alkaline solution 108 may vary within the range of about 0.1 mM to about 1 mM, from about 1 mM to about 5 mM, from about 5 mM to about 10 mM, from about 10 mM to about 20 mM, about 20 mM to about 30 mM, about 30 mM to about 40 mM, about 40 mM to about 50 mM and greater than about 50 mM.

In some embodiments, the alkaline solution 108 may comprise a base. Bases suitable for the cell 100 may include, but are not limited to, hydroxides. Examples of hydroxides may include, but are not limited to, potassium hydroxide (KOH), sodium hydroxide (NaOH), lithium hydroxide (LiOH), and other basic materials that can provide hydroxide ions in the solution. The concentration of the base within the alkaline solution 108 is sufficient to obtain the desired pH and may range, for example, between less than about 1 mM to concentrated solutions (e.g., 2M $OH^-$ and greater). Examples of concentrations may vary within the range of about 0.1 mM to about 1 mM, from about 1 mM to about 100 mM, from about 10 mM to about 100 mM, from about 100 mM to about 1000 mM, from about 1 M to about 2 M, from about 2 M to about 3 M, and greater than about 3M. The base may be further provided in a concentration sufficient to yield an alkaline solution 108 with a pH greater than about 7. For example, in certain embodiments, the pH may range between 7-8, 8-9,9-10, 10-11, 11-12, 12-13, 13-14, and greater than 14. Notably, substantially no degradation of the dye mediators is observed when operating under high pH conditions, for example at pH greater than 12 or pH greater than 14.

The fuel cell or battery 100 may operate under a wide range of pressures. For example, embodiments of the fuel cells and batteries disclosed herein may operate to generate power at pressures at about atmospheric pressure, above atmospheric pressure, and below atmospheric pressure. Embodiments of pressure ranges may include, but are not limited to, about 100 torr to 300 torr, about 300 torr to 500 torr, about 500 torr to about atmospheric pressure (e.g., about 750 torr), about atmospheric pressure (e.g., 1 atmosphere) to 3 atmospheres, about 3 atmospheres to 5 atmospheres, and greater than about 5 atmospheres.

Without being bound by theory, in some embodiments, the cell 100 may operate as follows. The alkaline solution 108 may be provided with the carbohydrate 106, and an oxidized form of the dye 110. The carbohydrate 108 may react in the presence of the oxidized dye 110A with the hydroxide 114 to yield an intermediate product 116. This intermediate product 116, in the presence of the oxidized dye 110A, may further react to form a carbohydrate reaction product 118, water ($H_2O$) 120, and reduced dye 110B. In some embodiments the alkaline solution 108 does not comprise a catalyst.

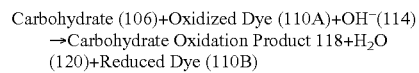

Carbohydrate (106)+Oxidized Dye (110A)+$OH^-$(114)
→Carbohydrate Oxidation Product 118+$H_2O$
(120)+Reduced Dye (110B)

The reduced dye 110B may shuttle the electron 122 and reoxidize on the anode surface.

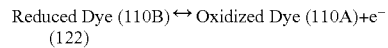

Reduced Dye (110B) ↔ Oxidized Dye (110A)+$e^-$
(122)

On the cathode, oxygen ($O_2$) 124 may react with water 120 and the electrons 122 to form hydroxide ions 114.

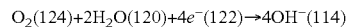

$O_2$(124)+2$H_2O$(120)+4$e^-$(122)→4$OH^-$(114)

Thus, on net, the inputs of carbohydrate 106 and oxygen 124 yield a carbohydrate oxidation product 118 and water ($H_2O$), without substantially producing carbon dioxide ($CO_2$) while producing electrical power.

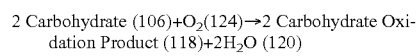

2 Carbohydrate (106)+$O_2$(124)→2 Carbohydrate Oxidation Product (118)+2$H_2O$ (120)

Without being bound by theory, is believed that the dye 110 functions in the fuel cell or battery 100 as a mediator, rather than as a catalyst. A catalyst does not serve in a reaction as a reactant or product but serves as an agent which promotes the kinetics of a reaction. For example, a catalyst may lower the activation energy barrier of the reaction and enhance the reaction rate constant in the rate equation. In contrast, mediators are electrochemical species that facilitate charge transfer through their ability to transfer electrons between active reaction sites and current collector surface via fast transport in the solution to enable a shuttle mechanism to complete a redox reaction. So, the mediators alter the equilibrium in the concentrations of the reactants and products under the Le Chatelier's principle. The continuous removal of the electrons may shift the equilibrium and propel the reaction to continue until the reaction cannot be sustained. Thus, embodiments of the fuel cells and batteries disclosed herein employ dyes 110 as mediators, rather than catalysts, for power generation. In some embodiments, no catalysts are used in the system.

Beneficially, embodiments of the disclosed fuel cells and batteries and related methods may operate to stably generate power at a broad range of temperatures, as the reactions occurring within the fuel cells or batteries are not strongly dependent upon the temperature of operation. For example, in certain embodiments, the operating temperatures may fall within the range from about the freezing temperature of the reactants fuel cells and batteries to the decomposition temperature of the reactants. In other embodiments, the operating temperatures may fall within the range of about −40° C. to about 300° C., from about −40° C. to about room temperature (e.g., about 20-25° C.), from about room temperature to about 150° C., and from about room temperature to about 40° C. In additional embodiments, the operating temperature of the fuel cells and batteries may be maintained at approximately normal human temperature, approximately 37° C. In other embodiments, the operating temperature of the fuel cells may be maintained at temperatures ranging between about 20° C. to 25° C., 25° C. to about 30° C., and 30° C. to about 35° C.

It may be further noted that embodiments of the disclosed fuel cells and batteries may be substantially ecologically friendly. As discussed in greater detail below, dye mediators 110 such as food dyes (e.g., indigo carmine) may be employed. These non-toxic dyes are less harmful to the environment than dyes such as viologens and, under certain circumstances, may be preferred for use. Furthermore, substantially no greenhouse gases, such as carbon dioxide, are produced by the fuel cells and batteries. Rather, the reaction products in power production are a carbohydrate reaction product 118 and water.

Additionally, as discussed in greater detail below, the operating time of the fuel cells and batteries of the present disclosure, without altering the alkaline solution, through stirring or adjustment of the pH or the use of buffers, is significant. For example, the cell may operate without substantial adjustment for hours or even days. In contrast, alternative technologies may require continued adjustment of the solution pH to maintain reaction conditions.

EXAMPLES

In the examples below, the manufacture and performance of embodiments of carbohydrate-oxygen alkaline fuel cells (or batteries) mediated by redox dyes are illustrated. It may be understood that these examples are presented for illustrative purposes and should not be construed to limit the scope of the disclosed embodiments.

The cathode material for the experiments discussed below was an air-breathing oxygen-reduction cathode comprising a silver-plated nickel screen electrode with approximately 0.6 mg/cm$^2$ loading using approximately 10% Pt on Vulcan XC-72 (Cabot Corp, Billerica, Mass.) with a micro-porous, fluorocarbon backing (BASF) used in the as-received condition without treatment. The anode material, unless otherwise noted, was a carbon felt with a thickness of about 3.18 mm (Product No. 43199, Alfa Aesar). Methyl viologen (MV), methylene green, and all other dyes, potassium hydroxide (KOH), glucose and other carbohydrates were purchased from Sigma-Aldrich and were used without further purification.

A BioLogic 16-channel VMP3 potentiostat/galvanostat was used to conduct all electrochemical measurements. In the fuel cell, the air-breathing cathode was exposed to the open air without any substantial additional air flow or air enrichment. The concentrations of each of the dyes, KOH, and glucose (or other carbohydrate) were employed as given below. All experiments were conducted at approximately room temperature and about ambient pressure. Platinum wire was used for the electrode contact to inhibit corrosion interference.

Figure 3:
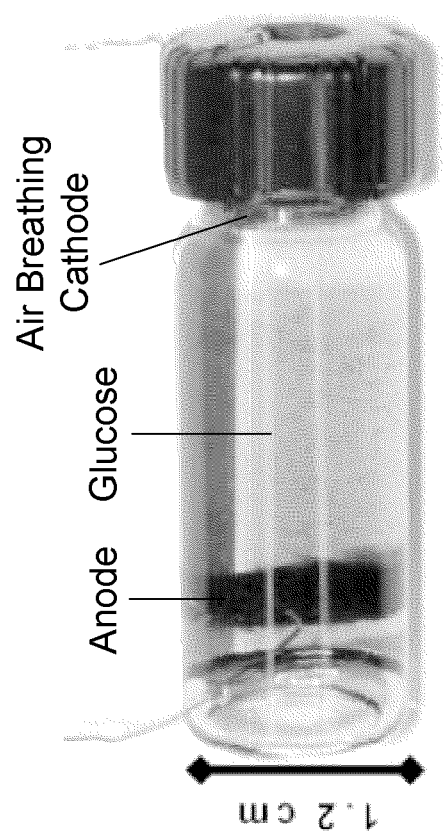
FIG. 3 illustrates an embodiment of a fabricated test cell.

An embodiment of an actual fuel cell is illustrated in FIG. 3. As illustrated in FIG. 3, the fuel cell does not employ a separator interposed between the cathode and anode to separate the two half-cell reactions taking place in the fuel cell.

Example 1

Glucose Alkaline Cell Having a Single Glucose Concentration

Figure 4:
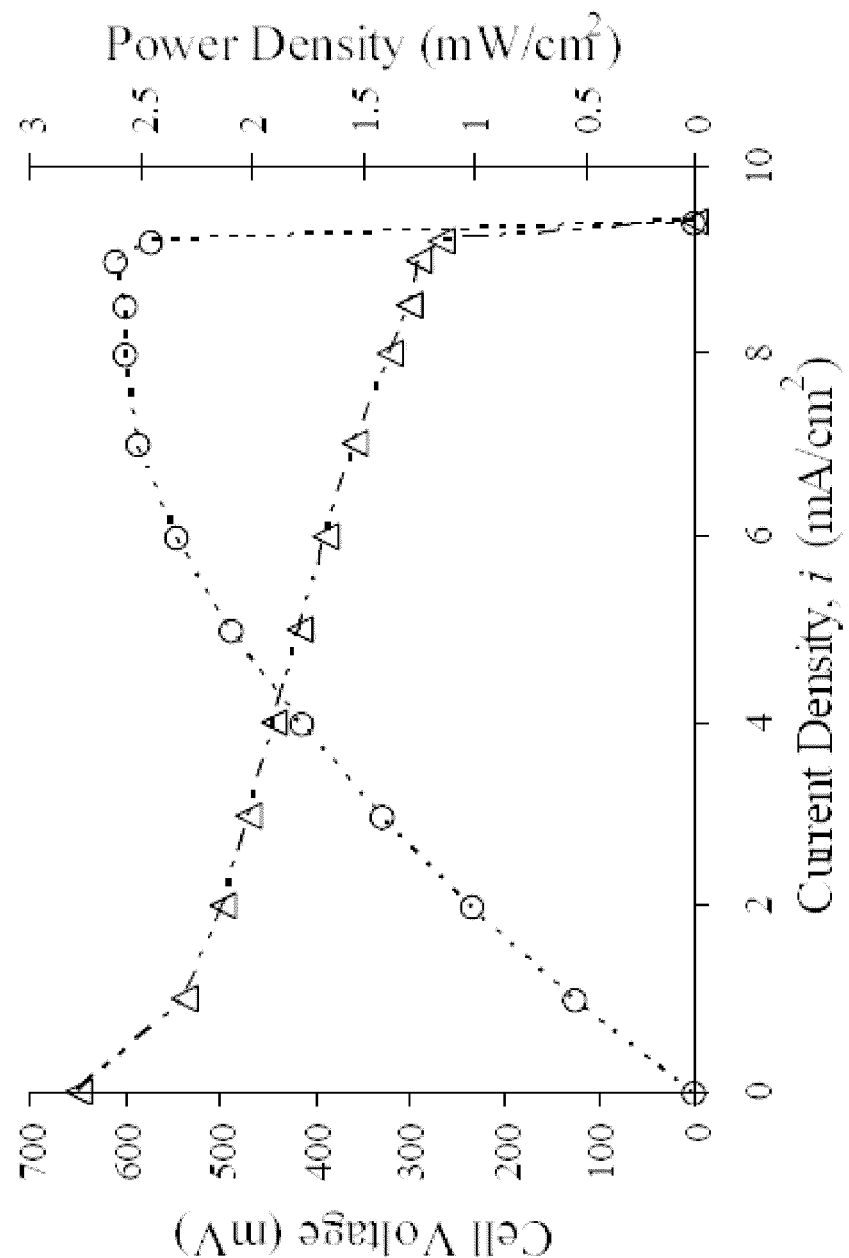
FIG. 4 illustrates polarization curves and power profiles for a fuel cell comprising about 2 M glucose in about 28 mM of mediator dye methyl viologen (MV) and about 3 M potassium hydroxide (KOH)

FIG. 4 illustrates the performance of an embodiment of a glucose alkaline cell, where the open triangles represent the cell voltage and the open circles represent power density. The alkaline solution included about 2 M glucose in about 3 M KOH and about 28 mM of a methyl viologen solution. Substantially no stirring or agitation of the solution was applied to the cell during power production.

In this fuel cell, an open circuit voltage of about 0.65 V was achievable with little dependence on the glucose concentration. In this case, the anode was at about −0.63 V versus Ag/AgCl, which is approximately close to what is expected for the formal redox potential of methyl viologen. The air-breathing cathode was at about 0.02 against Ag/AgCl. The ability to achieve the expected potential at the anode indicates the facile kinetics exerted by the electrode to reach equilibrium on the electrode surface, with respect to the methyl viologen redox reaction.

Example 2

Glucose Alkaline Cell Having Varied Glucose, Methyl Viologen, and KOH Concentrations Three experiments were conducted in Example 2 to examine the effects of varying glucose concentration, methyl viologen concentration, and KOH concentration on the performance of the cell. In each case, the baseline concentration for the three constituent reagents was the same as in Example 1, with the ratio of glucose:methyl viologen:KOH about 2 M:about 28 mM:about 3 M. The concentration of glucose was varied within the range of about 0.5 M to about 2 M, the concentration of methyl viologen was varied within the range of about 5 mM to about 28 mM, and the concentration of KOH was varied within the range of about 0.5 M to about 3 M. Substantially no stirring or agitation of the solution was applied to the cell during power production.

Figure 5:
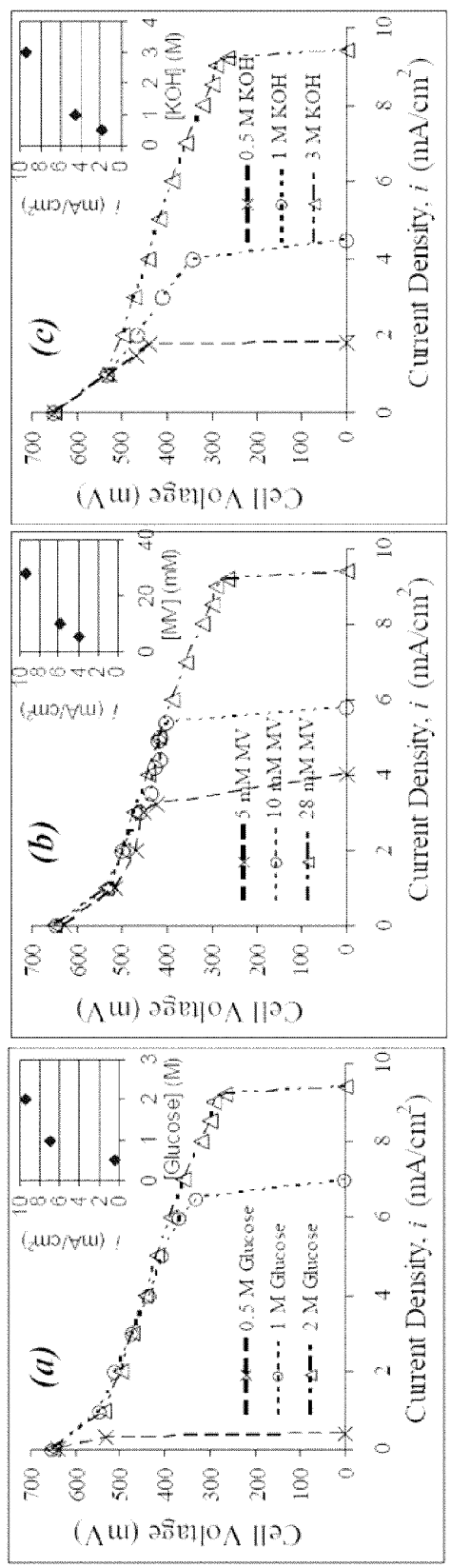
FIGS. 5A-5C illustrate the dependence of current generation on the concentration of components in embodiments of fuel cells; (A) glucose (with about 28 mM methyl viologen and about 3 M KOH), (B) methyl viologen (with about 2 M glucose and about 3 M KOH), and (C) KOH (with about 2 M glucose and about 28 mM methyl viologen)

FIGS. 5A-5C illustrate polarization curves (steady state cell voltage versus polarization current density profiles) showing the dependence of cell performance on the concentration of glucose (4A), methyl viologen (4B), and KOH (4C). A steady state voltage after each current step can be reached in about 20-30 minutes, if not shorter. Each inset of FIGS. 4A-4C is a plot of (short circuit) limiting current density versus the constituent reagent's concentration. In a cell containing only KOH and dye, substantially no power generation was determined.

Upon galvanostatic polarization, as shown in FIGS. 5A and 5B, the cell voltage follows a common descending trend with increasing current density. Except in low concentrations of glucose, the polarization shows little dependence on the concentration of glucose or dye. This common profile exhibits a rather low activation polarization loss, indicating that the polarization is likely dominated by the electrolyte conductivity, as shown by the dependence on the KOH concentration (in FIG. 5C), until the reaction reaches a purported mass transport limitation.

Example 3

Figure 6:
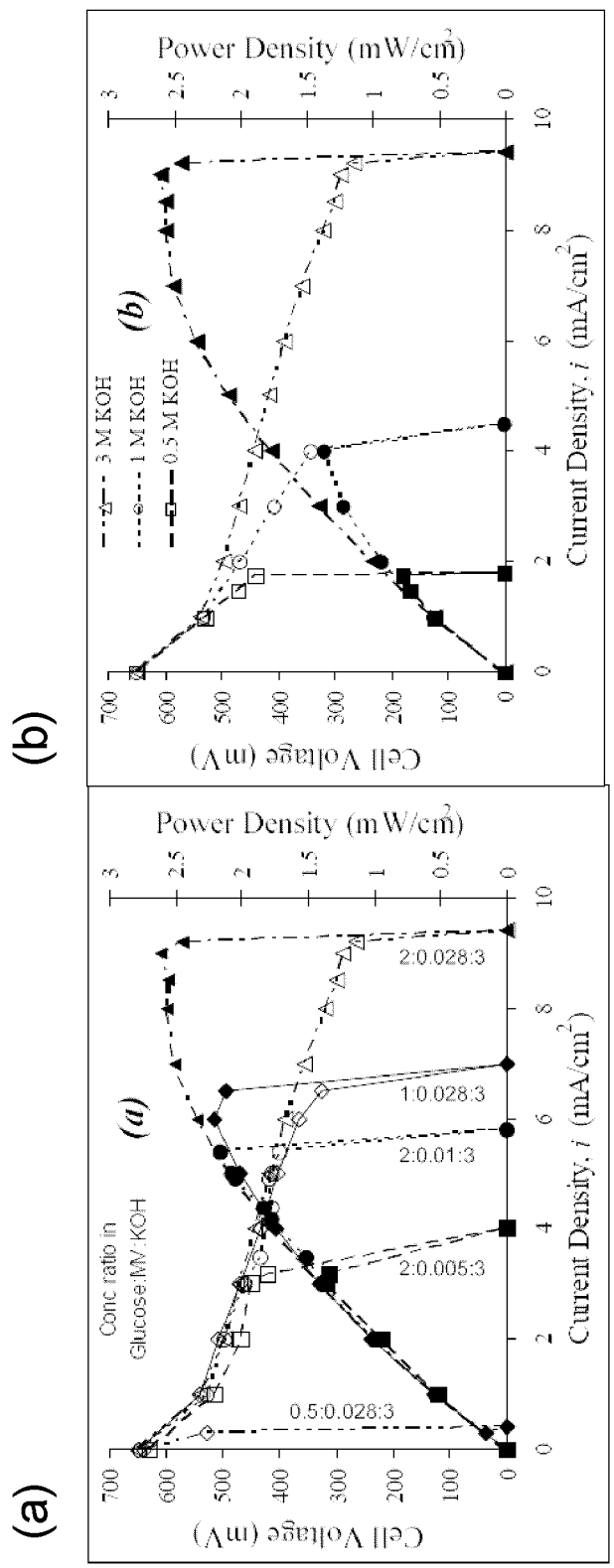
FIGS. 6A-6B illustrates polarization curves and power profiles for embodiments of fuel cells: (A) comprising various mediator dye concentrations and glucose concentrations; (B) comprising different KOH concentrations.

Glucose Alkaline Cell Having Different Concentration Ratios of Glucose to MV and KOH Concentrations Two experiments were conducted in Example 3 to examine the effects of varying the ratio of glucose concentration to methyl viologen concentration and the concentration of KOH on the performance of the cell. The results of the glucose to methyl viologen ratio experiments are illustrated in FIG. 6A, with the dye mediator concentration varying with the range of about 5 mM to about 28 mM and the glucose concentration varying within the range of about 0.5 M to 2 M in about 3 M KOH solution. The results of the glucose to KOH concentration experiments are illustrated in FIG. 6B, with the glucose concentration of about 2 M and the KOH concentration varying in the range of about 0.5 M to about 3 M.

In FIGS. 6A-6B, the power profiles reflect two distinct patterns in the behavior between dye (or glucose) and KOH. In the case of dye and glucose, it may be observed that the power profiles substantially superimpose upon one another; thus, they follow a common power generation profile over a wide range of dye and glucose concentration, which determines the (short-circuit) limiting polarization current density. The common power profile depicts that the maximum power and limiting current increase substantially monotonically with dye or glucose concentration (FIG. 6A), ranging from about 0.53 V, 0.3 mA/cm$^2$, and 0.16 mW/cm$^2$ at about 0.5 M glucose and about 5 mM MV to 9 mA/cm$^2$, and 2.6 mW/cm$^2$ at about 2 M glucose and about 28 mM methyl viologen.

In contrast, the power profiles of different KOH concentrations do not overlap (FIG. 6B). The polarization curves also show different slopes in the Ohmic regime (FIG. 5C), indicating that the ionic conductivity of the electrolyte is critical to power generation. It may also be noted that the transition from the maximum power generation to short-circuit limiting current operation is quite rapid, as shown in all figures. This transition seems faster than would be expected from a conventional mass-transport limiting regime. These unique characteristics revealed by the distinct, yet particular, concentration dependence in the power generation by each reagent depict a very intriguing chemistry underlying the power generation process.

Example 4

Performance of Other Dye Mediators

Figure 7:
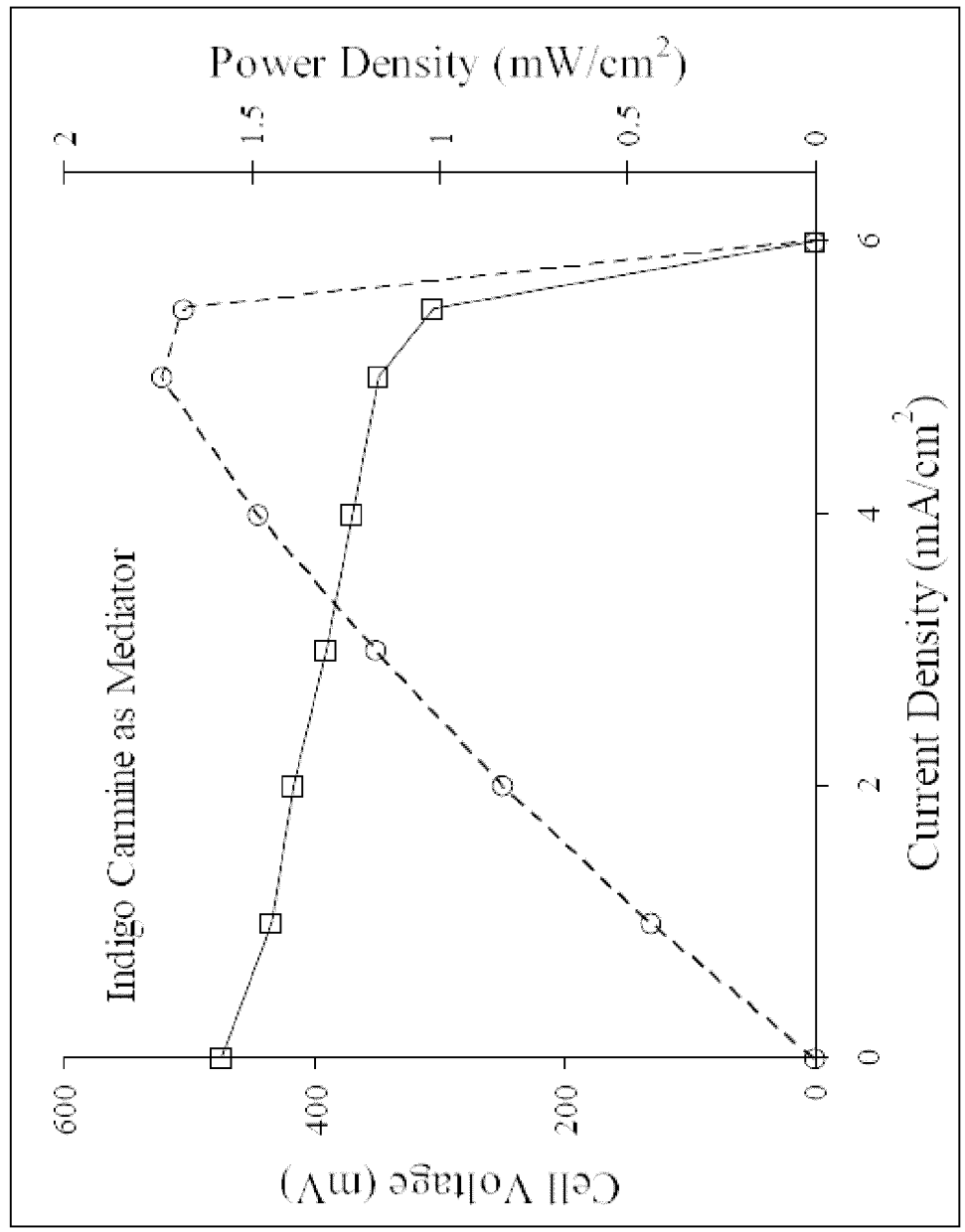
FIG. 7 illustrates the operation of an embodiment of a fuel cell comprising indigo carmine as the dye mediator.

In Example 4, tests were performed to evaluate the performance of fuel cell embodiments employing different dye mediators. Examples of such dye mediators may include, but are not limited to, Meldola's blue (MB), methylene blue, methylene green, indigo carmine, and safranin O. The performance of a representative fuel cell comprising indigo carmine in a concentration of about 6 mM, is illustrated in FIG. 7. The cell further comprised about 2 M glucose and about 3 M KOH in solution.

The results of FIG. 7 illustrate that indigo carmine and other dyes may perform equally well as those shown in the previous Examples 1-3. For example, cell voltages within the range of about 300-500 mV and power densities within the range of about 0-1.75 mW/cm$^2$ were observed for current densities within the range of about 0-6 mA/cm$^2$.

Example 5

Performance of Cell Comprising a Glassy-Carbon Electrode (GCE)

In Example 5, the results from a pair of experiments employing a glassy carbon electrode (GCE), rather than carbon felt, with and without mechanical stirring, are compared. Testing using a GCE addresses an important issue: the surface area of the electrode. The power densities and current densities reported above have been based on the geometric area of the electrodes in the cells. Although reporting such values in accessible electrode surface area would be more relevant in the consideration of kinetics, it is difficult to determine such an accessible surface area accurately in solution with the carbon felt used in the experiments. Thus, to provide more accurate assessment of the power and current density with the electrode surface, additional experiments with a GCE were performed, where the GCE replaces the carbon felt. The GCE presents a more well-defined accessible surface area, which is about the same as the geometric area.

Figure 8:
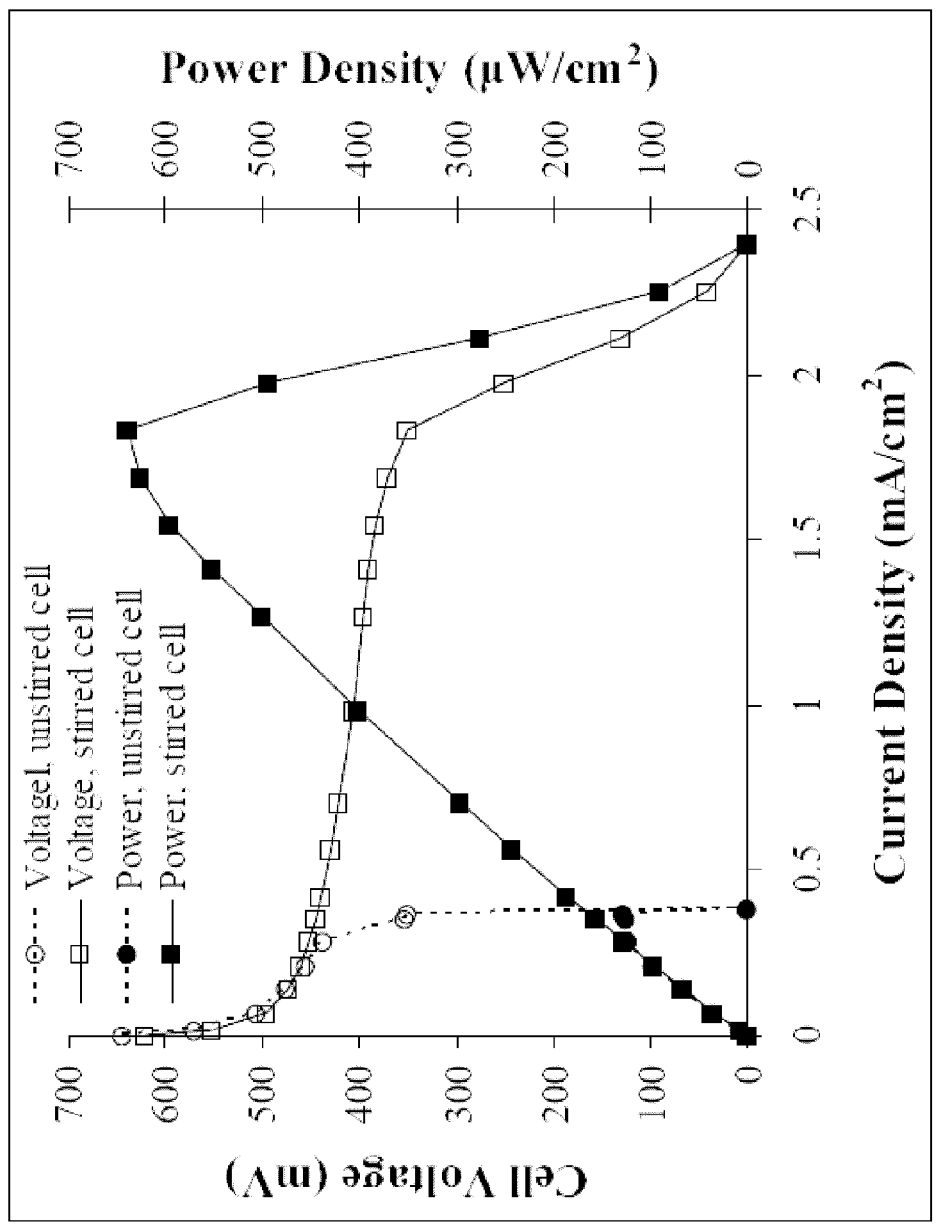
FIG. 8 illustrates galvanostatic polarization curves and respective power profiles of an embodiment of the test cell of FIG. 1 comprising fuel cells comprising glassy-carbon electrodes with and without mechanical stirring.

The polarization results of a cell with GCE anode comprising about 28 mM of methyl viologen and about 2 mM of glucose in about 3 M KOH, with and without stirring, are shown in FIG. 8. The results show that the maximum current density under the short-circuit condition and without mechanical stirring is about 0.4 mA/cm$^2$, while the maximum power density is about 130 µW/cm$^2$. In contrast, with mechanical stirring, the same electrode can exhibit short-circuit current of about 2.4 mA/cm$^2$ and a maximum power density of 650 µW/cm$^2$.

It is notable that without stirring, the polarization progresses from the maximum power generation to the short-circuit condition very rapidly, signaling that the cell performed at the maximum power generation (rate) whenever the mass transport could support it. Once the polarization current exceeds the mass transport limitation, the cell only operates under short circuit at the mass transport limitation. With mechanical stirring, the current density was improved by more than about six times, leading to the power density increasing more than about five times. The stirring also made the end of the polarization curve conclude with a more gradual tail-off behavior than is often observed in fuel cell kinetics under limiting mass transport.

Example 6

Durability Testing

Figure 9:
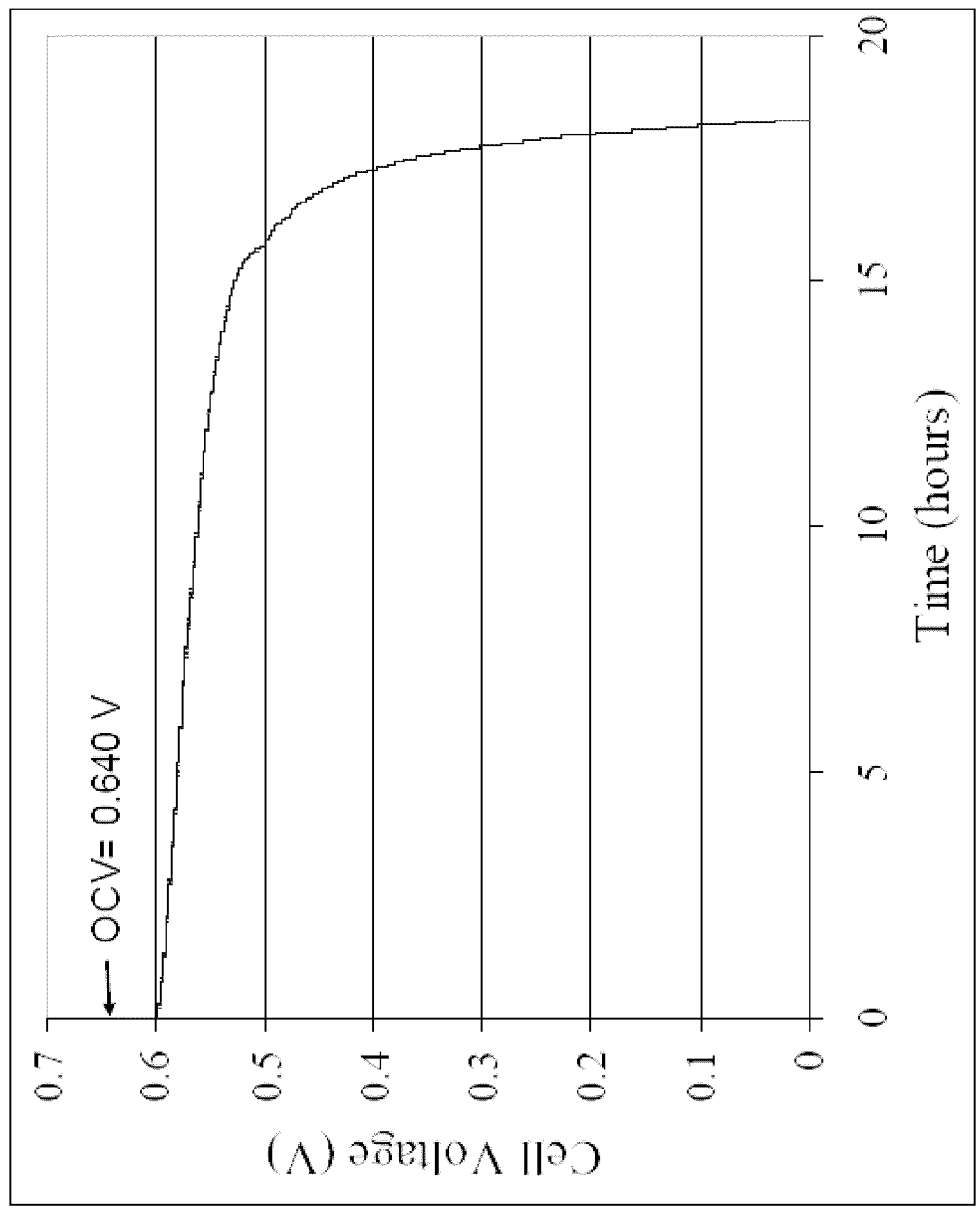
FIG. 9 illustrates a duration test of an embodiment of a glucose, dye-mediated alkaline fuel cell comprising about 1.6 mL of about 400 mM glucose in about 6 mM methyl viologen and about 1 M KOH under a galvanostatic polarization of about 0.7 mA.

In Example 6, a test cell was prepared for durability testing. The test cell comprised about 1.6 mL of about 400 mM glucose in about 6 mM methyl viologen and about 1M KOH. The cell was further subjected to galvanostatic polarization at about 0.7 mA, and the results are illustrated in FIG. 9. As illustrated in FIG. 9, the open circuit voltage was about 0.64

V and the cell ran for more than about 18 hours, without stirring buffering, or substantially any other adjustment to the pH of the cell.

Example 7

Performance of Fuel Cell Array Having Varied Glucose Concentration

In Example 7, the current response from a carbon-felt anode of about 5.3 mg under short-circuit condition imposed by the VMP3 galvanostat was monitored when as aliquots of about 10 mM glucose were intermittently added to a solution containing only about 1 M KOH and about 4 mM methyl viologen, initially. The solution was also stirred after each addition to improve the response time.

Figure 10:
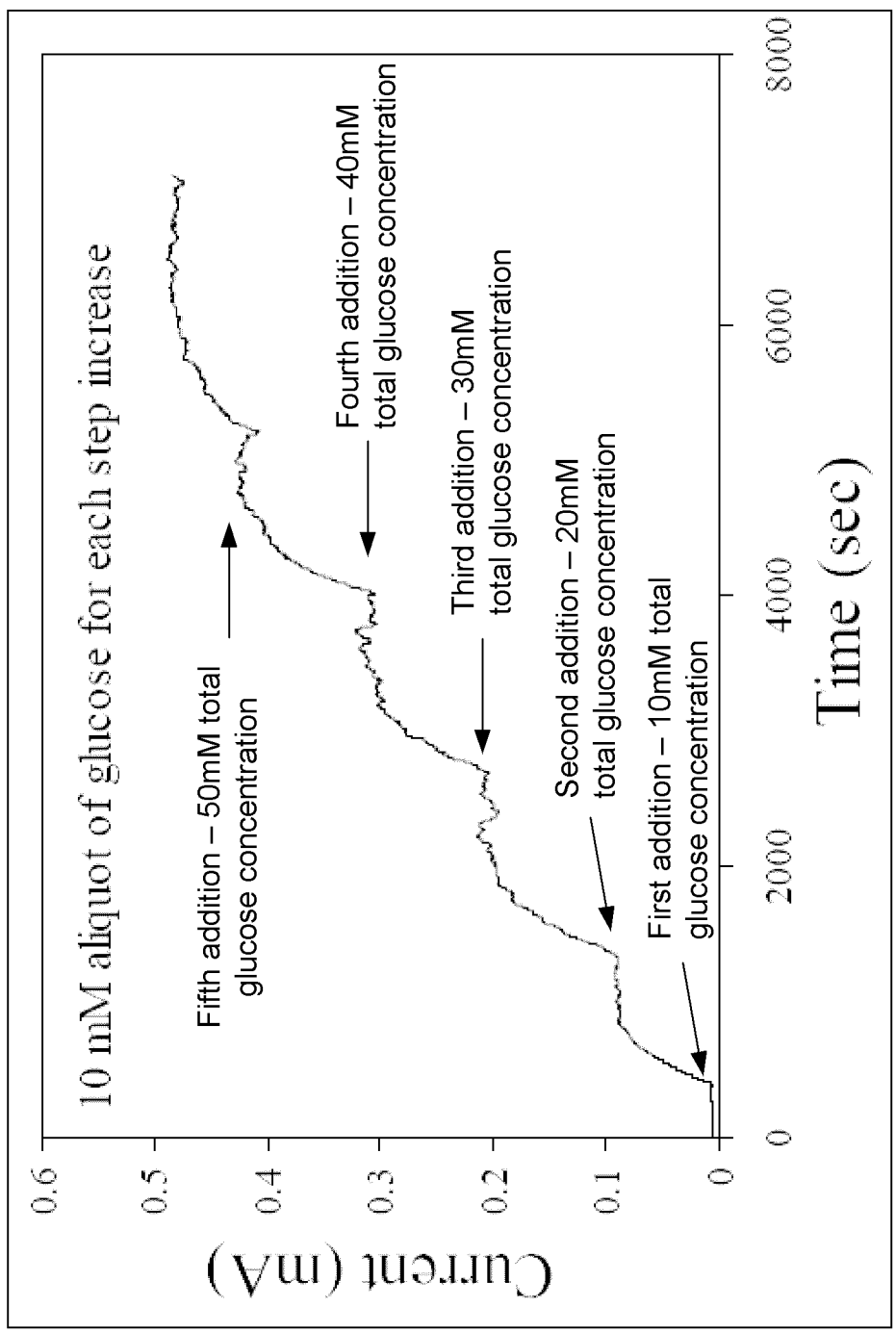
FIG. 10 illustrates the current output of the test cell of FIG. 1 as aliquots of glucose were added to a solution containing only about 1 M KOH and about 4 mM methyl viologen initially to increase the glucose concentration by about 10 mM each time.

The results of glucose addition as a function of time are illustrated in FIG. 10. It may be seen that, after each increase in concentration, an increase in the current output is observed. This response in current production by varying glucose concentration illustrates that the glucose is truly the fuel which generates the electric power.

Example 8

Performance of Other Carbohydrates

Figure 11:
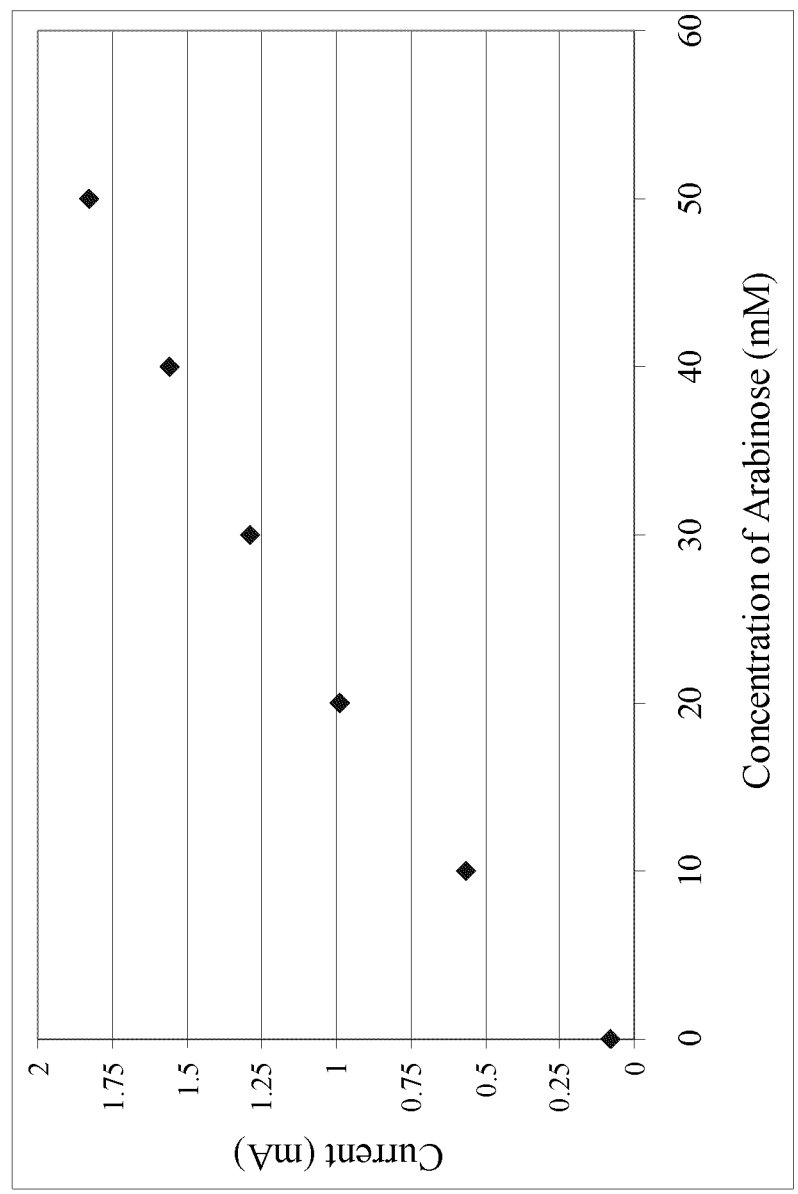
FIG. 11 illustrates the current output of a test cell comprising arabinose with about 10 mM methyl viologen and about 2 M KOH.

In Example 8, tests were performed to evaluate the performance of fuel cell embodiments employing different carbohydrates. Examples of such carbohydrates may include monosaccharides, but are not limited to, glucose, arabinose, sorbose, and fructose. The performance of a representative fuel cell comprising arabinose in various concentrations is illustrated in FIG. 11. The cell further comprised about 10 mM methyl viologen and about 2 M KOH in solution.

The results of FIG. 11 illustrate that arabinose and other carbohydrates may perform equally well as those shown in the previous Examples 1-7.

Discussion of Results

From the literature, it is known that in enzymatic bio-fuel cells, glucose oxidation occurs in a two-electron process, due to the selective nature of the enzyme catalysis, as follows:
On the anode:

$$\beta\text{-D-glucose} \rightarrow \delta\text{-gluconolactone} + 2H^+ + 2e^- \quad (1)$$

On the cathode:

$$O_2 + 4H^+ + 4e^- \rightarrow 2H_2O \quad (2)$$

Cell:

$$2\beta\text{-D-glucose} + O_2 \rightarrow 2\delta\text{-gluconolactone} + 2H_2O \quad (3)$$

In microbial bio-fuel cells, the metabolism in the living cells can drive the glucose oxidation completely to $CO_2$ according to:
On the anode:

$$\beta\text{-D-glucose} + 6H_2O \rightarrow 6CO_2 + 24H^+ + 24e^- \quad (4)$$

On the cathode:

$$O_2 + 4H^+ + 4e^- \rightarrow 2H_2O \quad (5)$$

Cell:

$$\beta\text{-D-glucose} + 6O_2 \rightarrow 6CO_2 + 6H_2O \quad (6)$$

In abiotic cells where a Pt-based anode is used, the glucose is partially oxidized to a gluconic acid in a two-electron process:

On the anode:

$$\beta\text{-D-glucose} + 2MV^{2+} + 2OH^- \rightarrow \delta\text{-gluconolactone} + 2H_2O + 2MV^+ \quad (7)$$

These reactions are for acidic or neutral pH conditions. In alkaline cells of embodiments of the present disclosure, disregarding with the presence of the dye (MV), the glucose oxidation could occur through a partial oxidation pathway:
In the solution:

$$\beta\text{-D-glucose} + 2MV^{2+} + 2OH^- \rightarrow \delta\text{-gluconolactone} + 2H_2O + 2MV^{\bullet+} \quad (8)$$

The reduced MV ($MV^{\bullet+}$) will shuttle the electron and reoxidize on the anode surface according to:
On the anode:

$$MV^{\bullet+} \leftrightarrow MV^{2+} + e^- \quad (9)$$

On the cathode:

$$O_2 + 2H_2O + 4e^- \rightarrow 4OH^- \quad (10)$$

Cell:

$$2\beta\text{-D-glucose} + O_2 \rightarrow 2\delta\text{-gluconolactone} + 2H_2O \quad (11)$$

It is important to note that the redox MV basically functions as an electron shuttle medium, while the partial oxidation of glucose actually occurs in the solution in the presence of hydroxide ions. Previous studies further suggest that $OH^-$ interacts with glucose in the formation of the glucose-enediol. This ene-diol likely serves as the electron transfer intermediate. The product of this reaction would be gluconolactone. It is unlikely that further oxidation would occur, because the lactone and its derivative are quite stable. It is an open question whether the complete oxidation of glucose can be achieved with a single mediator like viologen. Such a pathway requires a number of C—C bonds to be broken down by the mediator.

The common power generation profile shared by glucose and dye over a wide range of concentration is a unique feature. As observed above, the anode exhibits the redox potential of methyl viologen at open circuit, and such potential is independent of glucose concentration. It is evident that the anodic reaction indeed involves the oxidation of reduced methyl viologen ($MV^{\bullet+}$) as described in (9). Such methyl viologen redox reaction and its applications in providing electron shuttling between substrate reaction at bioelectroactive center and current collecting electrode surface have often been used in mediated bio-electrics for biosensing and biofuel cell applications. The insensitivity of open circuit potential to glucose concentration also implies that glucose is not electroactive on the anode surface.

Example 7 also illustrated that the current/power generation only takes place in the presence of glucose and it is therefore evident that glucose is the fuel. Variations of glucose or dye concentration in 3 M KOH solution may affect the electron transfer rate and thus alter the amount of reduced methyl viologen available for current/power generation. These experiments indicate a commonly shared power profile for glucose and dye, therefore, the current appears to reflect the flux of reduce dye arriving at the anode. It may be further inferred that the maximum power is contingent on the flux of the dye at its mass transport limit for a specific concentration and, once the imposed galvanostatic polarization exceeds such mass transport limit, the cell will run to short circuit, which explains the rapid drop off of the cell voltage to the short circuit condition beyond the maximum power.

FIG. 7 provides additional evidence of such mass transport limitation. By mechanical stirring, better mass transport was facilitated and resulted in a longer, more gradual tail of the polarization curve and a higher limiting current density. Finally, it is important to point out that this chemistry of ene-diol formation occurs in the solution. Through electron transfer between the ene-diol intermediate and the mediator, which migrates to the anode surface to complete the half-cell reaction, chemical energy was harnessed from the partial oxidation of glucose.

This mechanism is very different from those of the traditional fuel cells, where the fuel redox reactions occur on the electrode surfaces (or electrolyte/electrode interface) and require help with catalysts. This unique nature also provides an opportunity to operate the cell at a substantially optimal volume-to-surface ratio with a minimum mass transport limitation.

Given the multi-body interactions involved in the electron transfer, whether on the electrode surface or in the solution, detailed stepwise reaction mechanism should be further investigated to provide more insight into how this system works and to push the extent of oxidation for better use of the fuels. Postulated, as if the partial oxidation two-electron process in (8) prevailed, a coulombic charge transfer efficiency on the order of about 30-40% may be derived on the basis of several long galvanostatic experiments in which the depletion of glucose in the solution was perceived as evident by the apparent decrease in voltage at the end of the cell operation under a galvanostatic condition. A 1.6 mL solution of about 400 mM glucose in about 6 mM methyl viologen and about 1 M KOH can generate about 0.7 mA over about 18.3 hours (Example 6) which is about 37% in coulombic efficiency. Recent experiments showed that much higher coulombic efficiency (better than 90%) could be achieved with time to let the reaction complete with minimum current and voltage at the end.

The cause of parasitic loss in coulombic efficiency remains ambiguous at this time. One possible loss could be the formation of peroxides as the reactive ene-diol form of glucose interacts with $O_2$, which could poison the cathode reaction. Another possible cause is related to the stability of the dye in the charge transfer cycle. It has been reported[13] that overly reduced MV to MV•• may become inactive in electron transfer. Another cause of parasitic loss may be due to oxygen, as it is known for its affinity to oxidize reduced dyes quickly. The possible interference of $CO_2$ in the air and the associated bicarbonate-carbonate formation and shuttle process, which may lead to efficiency loss has also been noted. Although it is known that $CO_2$ in the air and the bicarbonate/carbonate formation interfere cell operation in alkaline fuel cell and metal-air batteries, no substantial interference in the cell operation was observed. However, the results illustrated herein show no substantial difference in the maximum power generation between aerobic and anaerobic conditions. Furthermore, this is anticipated to be the case for all dye mediators discussed herein.

In summary, embodiments of systems and methods for harnessing energy directly from carbohydrates such as monosaccharides to produce electric power that do not rely on catalysts have been described and demonstrated. Such systems and methods are simple to assemble and perform with a variety of inexpensive raw materials; i.e., the process does not seem to be resource limiting. The performance results achieved in test cells suggest that the rate-limiting step of the substrate redox reaction may occur in the bulk solution, while the anode half-cell reaction may rely on a mediator shuttle process. Such a mechanism that allows operation of the cell at the kinetic limits to achieve the maximum power without a catalyst is new to existing fuel cell operations and constitutes a significant advancement.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or sub-combinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above but should be defined by the appended claims.

What is claimed is:

1. A method of operating a fuel cell, the method comprising:
   providing an anode;
   providing a cathode; and
   contacting the anode and the cathode with an alkaline solution, the alkaline solution comprising one or more carbohydrates and a mediator dye selected from the group consisting of azides and carmines;
   wherein the operating temperature of the fuel cell is maintained between about 20° C. and about 35° C., wherein the fuel cell does not comprise a membrane, and wherein the carbohydrate is selected from the group consisting of glucose, arabinose, sorbose, and fructose.

2. The method of claim 1, wherein the anode comprises at least one of a glassy carbon and a carbon felt.

3. The method of claim 1, wherein the dye is methyl viologen.

4. The method of claim 1, wherein the dye is selected from the group consisting of Medola's blue, methylene blue, methylene green, indigo carmine, and safranin O.

5. The method of claim 1, further comprising a hydroxide (OH$^-$) containing base.

6. The method of claim 5, wherein the base is provided in a concentration such that the pH of the alkaline solution is greater than 14.

7. The method of claim 1, wherein the alkaline solution is not stirred.

8. The method of claim 1, wherein the alkaline solution is not buffered.

9. The method of claim 1, fuel cell is operated at about atmospheric pressure.

10. A method of generating a current, comprising:
    reacting a carbohydrate with an oxidized form of a dye and hydroxide ions in an alkaline solution to yield at least a reduced from of the dye and an oxidized form of the carbohydrate;
    oxidizing the dye at an anode to recover the oxidized form of the dye and one or more electrons; and
    reacting oxygen with water and the one or more produced electrons at a cathode to form hydroxide ions
    wherein the dye is selected from the group consisting of azides and carmines; and
    and wherein reacting the carbohydrate, oxidizing the dye, and reacting the oxygen are performed at a temperature between about 20° C. and about 35° C., and wherein the carbohydrate is selected from the group consisting of glucose, arabinose, sorbose, and fructose.

11. The method of claim 10, wherein the anode comprises one of a glassy carbon and a carbon felt.

12. The method of claim 10, wherein the dye is methyl viologen.

13. The method of claim 10, wherein the dye is selected from the group consisting of Medola's blue, methylene blue, methylene green, indigo carmine, and safranin O.

14. The method of claim 10, wherein the pH of the alkaline solution is greater than 14.

15. The method of claim 10, wherein the alkaline solution is not stirred.

16. The method of claim 10, wherein the alkaline solution is not buffered.

17. The method of claim 10, wherein reacting the carbohydrate, oxidizing the dye, and reacting the oxygen are performed at about atmospheric pressure.

\* \* \* \* \*

UNITED STATES PATENT AND TRADEMARK OFFICE
CERTIFICATE OF CORRECTION

PATENT NO. : 8,846,266 B2
APPLICATION NO. : 12/769598
DATED : September 30, 2014
INVENTOR(S) : Daniel Marin Scott It is certified that error appears in the above-identified patent and that said Letters Patent is hereby corrected as shown below:

On the Title Page
    In column 2 (page 2, item 56) at line 30, Under Other Publications, Change "Carbohyrdrates" to --Carbohydrates--.

In the Claims
    In column 14 at line 41, In Claim 4, change "Medola's" to --Meldola's--.
    In column 14 at line 44, In Claim 5, change "(OH")" to --(OH-)--.
    In column 14 at line 57, In Claim 10, change "from" to --form--.
    In column 14 at line 65, In Claim 10, before "and" insert --wherein carbon dioxide is not a product of the reaction,--.
    In column 15 at line 8, In Claim 13, change "Medola's" to --Meldola's--.

Signed and Sealed this
Twenty-first Day of April, 2015

Michelle K. Lee
*Director of the United States Patent and Trademark Office*